United States Patent
Abe et al.

(10) Patent No.: US 12,028,591 B2
(45) Date of Patent: Jul. 2, 2024

(54) IMAGING APPARATUS AND MOBILE OBJECT

(71) Applicant: KYOCERA Corporation, Kyoto (JP)

(72) Inventors: Hiroyuki Abe, Yokohama (JP); Kazuki Shirato, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 157 days.

(21) Appl. No.: 17/754,044

(22) PCT Filed: Sep. 8, 2020

(86) PCT No.: PCT/JP2020/033938
§ 371 (c)(1),
(2) Date: Mar. 22, 2022

(87) PCT Pub. No.: WO2021/059964
PCT Pub. Date: Apr. 1, 2021

(65) Prior Publication Data
US 2022/0385790 A1    Dec. 1, 2022

(30) Foreign Application Priority Data
Sep. 26, 2019    (JP) .................... 2019-176166

(51) Int. Cl.
*H04N 23/51*    (2023.01)
*H04N 23/54*    (2023.01)

(52) U.S. Cl.
CPC ............. *H04N 23/51* (2023.01); *H04N 23/54* (2023.01)

(58) Field of Classification Search
CPC ............................... H04N 23/51; H04N 23/54
See application file for complete search history.

(56) References Cited

U.S. PATENT DOCUMENTS

| | | |
|---|---|---|
| 6,616,480 B2 | 9/2003 | Kameyama |
| 2002/0101041 A1* | 8/2002 | Kameyama .......... H01R 13/521 277/628 |
| 2011/0279675 A1 | 11/2011 | Mano et al. |

FOREIGN PATENT DOCUMENTS

| | | |
|---|---|---|
| EP | 2 393 277 A1 | 7/2011 |
| JP | 2002231375 A | 8/2002 |
| JP | 2018137401 A | 8/2018 |

* cited by examiner

*Primary Examiner* — Girumsew Wendmagegn
(74) *Attorney, Agent, or Firm* — Studebaker & Brackett PC

(57) ABSTRACT

An imaging apparatus includes an imaging substrate, a connector substrate, and a housing. The imaging substrate is provided with an imaging device that produces image data. The connector substrate is movably connected to the imaging substrate. The connector substrate includes a terminal configured to be connectable in a first direction to an external connector to which the image data is output. The imaging substrate and the connector substrate are accommodated in the housing. The housing includes a restricting section that restricts a position of the connector substrate in the first direction. The connector substrate is configured to be movable within a predetermined range in a direction intersecting the first direction.

10 Claims, 5 Drawing Sheets

IMAGING APPARATUS AND MOBILE OBJECT

CROSS-REFERENCE TO RELATED APPLICATION

The present application claims priority to Japanese Patent Application No. 2019-176166, filed on Sep. 26, 2019, the content of which is incorporated by reference herein in its entirety.

TECHNICAL FIELD

The present disclosure relates to an imaging apparatus and a mobile object.

BACKGROUND ART

A known sealing structure prevents an impairment of performance of an accessory module of a camera by blocking entry of foreign matter into the accessory module and provides ease of maintenance (see, for example, Patent Literature 1).

CITATION LIST

Patent Literature

PTL 1: Japanese Unexamined Patent Application Publication No. 2002-231375

SUMMARY OF INVENTION

An imaging apparatus according to an embodiment of the present disclosure includes an imaging substrate, a connector substrate, and a housing. The imaging substrate is provided with an imaging device that produces image data. The connector substrate is movably connected to the imaging substrate. The connector substrate includes a terminal configured to be connectable in a first direction to an external connector to which the image data is output. The imaging substrate and the connector substrate are accommodated in the housing. The housing includes a restricting section that restricts a position of the connector substrate in the first direction. The connector substrate is configured to be movable within a predetermined range in a direction intersecting the first direction.

A mobile object according to another embodiment of the present disclosure includes an imaging apparatus installed therein. The imaging apparatus includes an imaging substrate, a connector substrate, and a housing. The imaging substrate is provided with an imaging device that produces image data. The connector substrate is movably connected to the imaging substrate. The connector substrate includes a terminal configured to be connectable in a first direction to an external connector to which the image data is output. The imaging substrate and the connector substrate are accommodated in the housing. The housing includes a restricting section that restricts a position of the connector substrate in the first direction. The connector substrate is configured to be movable within a predetermined range in a direction intersecting the first direction.

DESCRIPTION OF EMBODIMENTS

Figure 1:
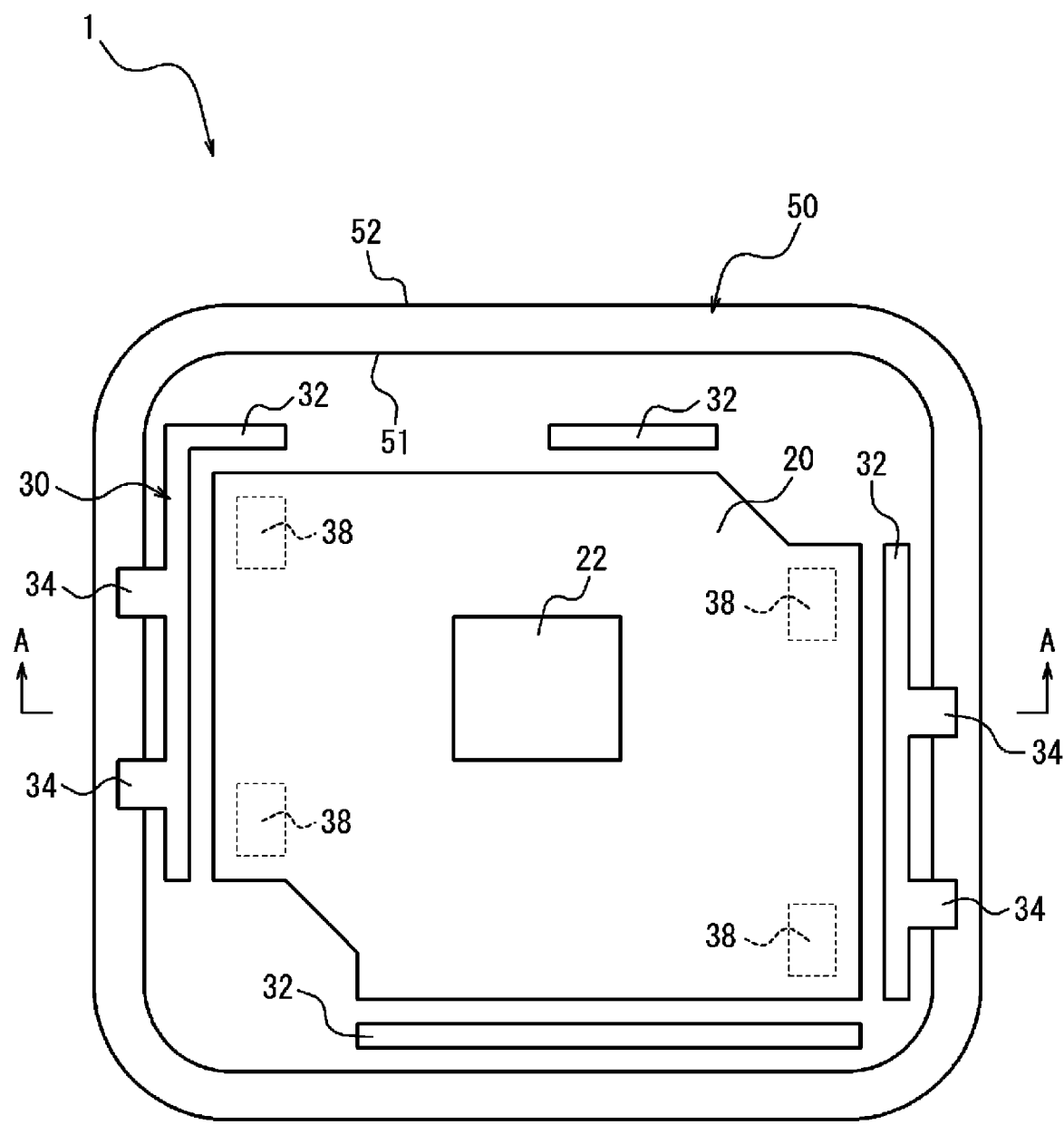
FIG. 1 is a plan view of an imaging apparatus according to an embodiment, illustrating an example of the configuration of the imaging apparatus.

There has been a demand for imaging apparatuses that ensure both ease of assembly and sealing performance. An imaging apparatus and a mobile object according to an embodiment of the present disclosure can ensure both ease of assembly and sealing performance.

Referring to FIGS. 1 to 5, an imaging apparatus 1 according to an embodiment includes a lens 58, a holding member 56, an imaging substrate 10, a connector substrate 20, and a housing 50. The imaging apparatus 1 may also include a first sheet metal 30. The first sheet metal 30 is also referred to as a sheet-metal member.

Figure 2:
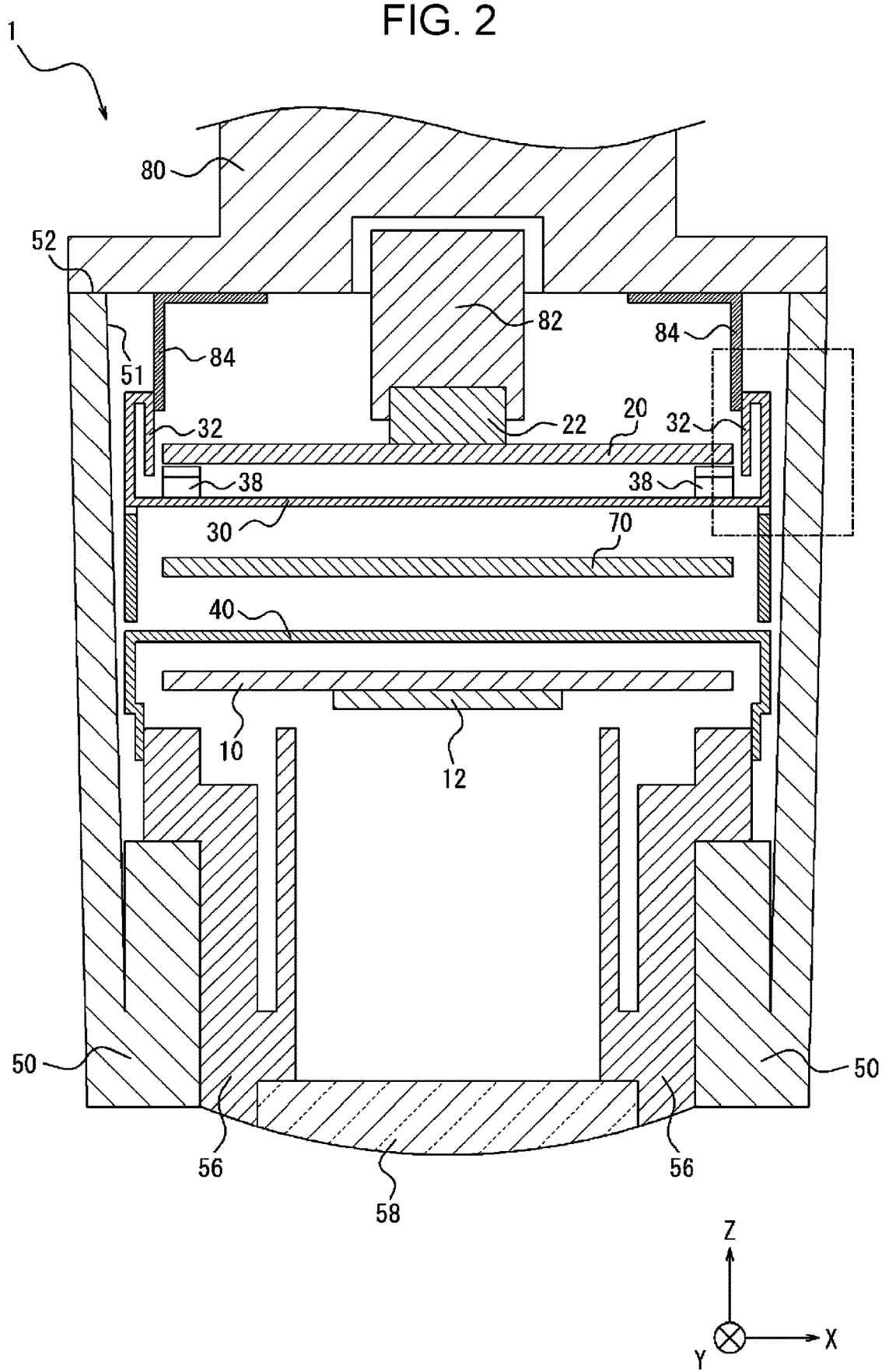
FIG. 2 is a sectional view taken along line A-A in FIG. 1.

The housing 50 has an internal space in which the lens 58, the holding member 56, the imaging substrate 10, the connector substrate 20, and the first sheet metal 30 are placed. The internal space of the housing 50 is defined by an inner wall surface 51 as illustrated in FIGS. 1 and 2. The housing 50 may be made of a material such as resin. The housing 50 may be made of resin or may be made of various materials.

The imaging apparatus 1 captures, by an imaging device 12 mounted on the imaging substrate 10, an object image formed by the lens 58. The imaging device 12 produces image data upon capturing the object image. The imaging substrate 10 is connected to the connector substrate 20 and outputs the image data to the connector substrate 20. With the connector substrate 20 being provided, the imaging apparatus 1 is configured to be connectable to an external connector 80. The imaging apparatus 1 outputs the image data to an external apparatus through the external connector 80. That is, the imaging apparatus 1 outputs the image data to the external connector 80.

The lens 58 is also referred to as an optical member. The lens 58 forms an object image incident on the imaging apparatus 1. The holding member 56 holds the lens 58. The lens 58 is joined to the holding member 56. Two or more lenses 58, instead of the lens 58, may be included. At least one of such lenses 58 may be replaced with another optical member, such as a mirror. The lens 58 may be bonded to the holding member 56 with, for example, an adhesive. The lens 58 may be joined to the holding member 56 via a fitting structure. The lens 58 may be joined to the holding member 56 by fastening with screws or the like.

As illustrated in FIG. 2, the imaging device 12 is mounted on the imaging substrate 10. The imaging device 12 has an imaging surface. The imaging substrate 10 is disposed so that the imaging surface of the imaging device 12 is located in an image-forming plane of the lens 58. An object image formed on the imaging surface by the lens 58 is captured by the imaging device 12. The imaging device 12 may, for example, be a complementary metal oxide semiconductor (CMOS) image sensor or a charge-coupled device (CCD). In addition to the imaging device 12, a circuit for processing data output from the imaging device 12 may be mounted on the imaging substrate 10. The imaging substrate 10 may, for example, be a printed circuit board.

The imaging substrate 10 is joined to the holding member 56. The imaging substrate 10 may be bonded to the holding member 56 with, for example, an adhesive. The imaging substrate 10 may be joined to the holding member 56 via a fitting structure. The imaging substrate 10 may be joined to the holding member 56 by fastening with screws or the like.

As illustrated in FIG. 2, the connector substrate 20 and the lens 58 are disposed on opposite sides with respect to the imaging substrate 10 therebetween. In other words, the connector substrate 20 is farther than the imaging substrate 10 when viewed from the lens 58.

Figure 3:
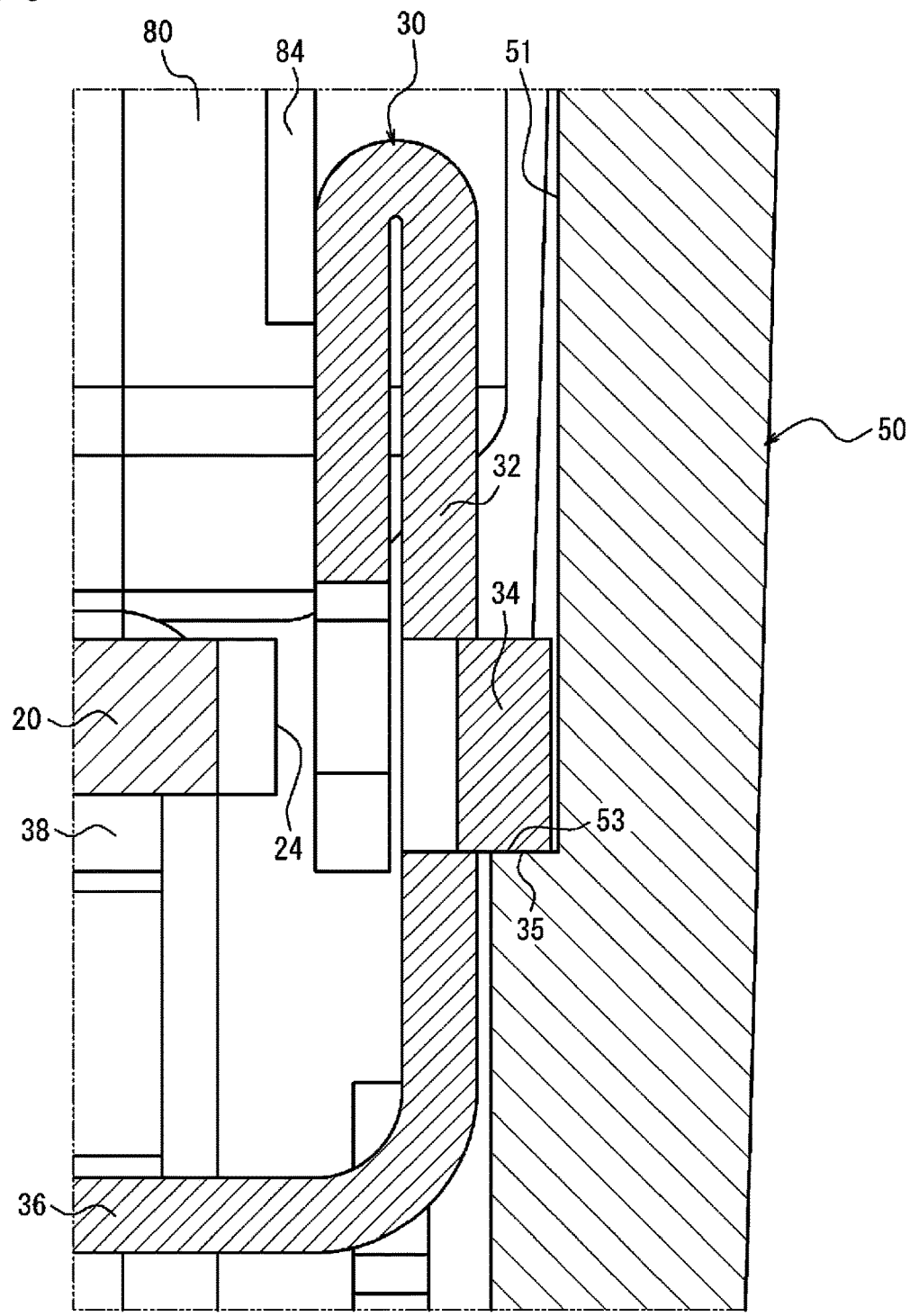
FIG. 3 is an enlarged view of a region enclosed with a dash-dot line in FIG. 2.

As illustrated in FIGS. 1, 2, and 3, the connector substrate 20 is supported by the first sheet metal 30 on the negative side in the Z-axis direction. The first sheet metal 30 includes a base 36, which extends along the connector substrate 20. The first sheet metal 30 also includes substrate-supporting portions 38, which protrude from the base 36 toward the positive side in the Z-axis direction. The connector substrate 20 is supported on the positive side in the Z-axis direction of the substrate-supporting portions 38. That is, the first sheet metal 30 keeps the connector substrate 20 from shifting toward the negative side in the Z-axis direction.

Referring to FIGS. 1 and 3, the first sheet metal 30 includes protrusions 34, which protrude from a side surface portion 32 to the positive side and the negative side in the X-axis direction. As illustrated in FIG. 3, each protrusion 34 includes a restricted section 35, which is a surface on the negative side in the Z-axis direction. The housing 50 includes a restricting section 53, which is a surface on the positive side in the Z-axis direction of a portion protruding from the inner wall surface 51 toward the negative side in the X-axis direction (see FIG. 3). The restricted sections 35 of the first sheet metal 30 are in contact with the restricting section 53 of the housing 50 such that the first sheet metal 30 is kept from shifting toward the negative side in the Z-axis direction. As mentioned above, the first sheet metal 30 includes the substrate-supporting portions 38 to keep the connector substrate 20 from shifting toward the negative side in the Z-axis direction. It can thus be said that the restricting section 53 of the housing 50 keeps the connector substrate 20 from shifting toward the negative side in the Z-axis direction.

Figure 4:
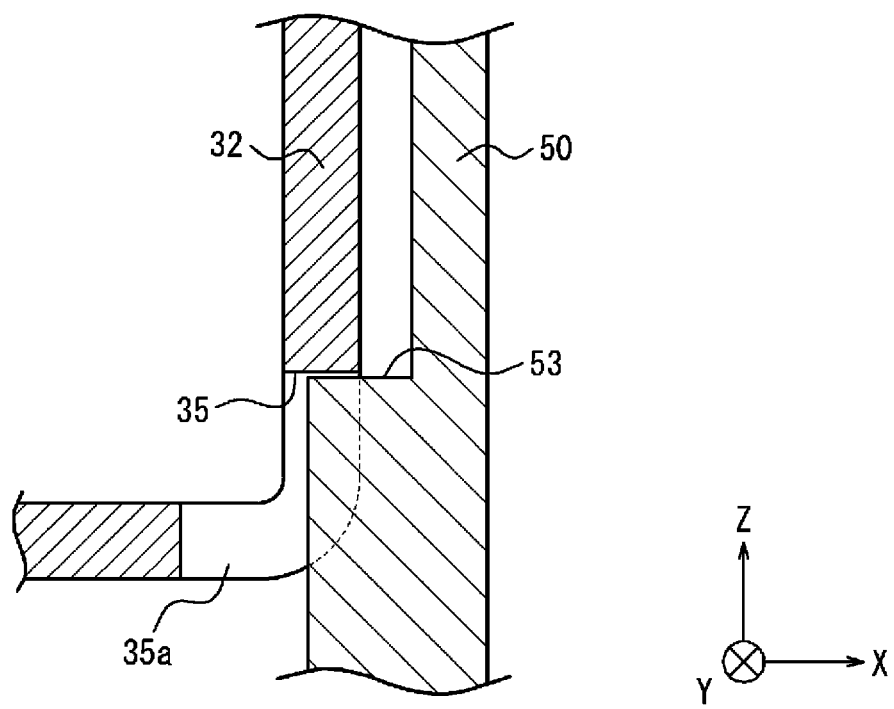
FIG. 4 is a sectional view, illustrating an example of how the position is restricted by a cutout in a side surface portion.

As illustrated in FIG. 4, the side surface portion 32 of the first sheet metal 30 may have a cutout 35a. The cutout 35a is provided in the side surface portion 32 such that the side surface portion 32 includes the restricted section 35 oriented toward the negative side in the Z-axis direction. In this case, the restricted sections 35 of the first sheet metal 30 are also in contact with the restricting section 53 of the housing 50 such that the first sheet metal 30 is kept from shifting toward the negative side in the Z-axis direction.

The side surface portion 32 of the first sheet metal 30 is elastic. The side surface portion 32 is configured to be capable of shifting away from the inner wall surface 51 of the housing 50 toward the inner side, with the bending point on the base 36 as a pivot point. Even when the side surface portion 32 includes the protrusions 34 protruding toward the inner wall surface 51, the first sheet metal 30 is more smoothly accommodated in the housing 50, because the side surface portion 32 shifts away from the inner wall surface 51 toward the inner side. Once the first sheet metal 30 is accommodated in the housing 50, the side surface portion 32 exerts elastic force toward the inner wall surface 51. The elastic force makes the first sheet metal 30 less prone to move in the Z-axis direction.

The housing 50 has an end portion 52, which is located on the positive side in the Z-axis direction. The housing 50 has an opening defined by the end portion 52 on the positive side in the Z-axis direction. The internal space of the housing 50 communicates with the outside of the housing 50 through the opening. The connector substrate 20 is slid into the internal space of the housing 50 through the opening. The external connector 80 is inserted toward the negative side in the Z-axis direction and connected to the connector substrate 20 through the opening. When the external connector 80 is inserted into the imaging apparatus 1 toward the negative side in the Z-axis direction and connected, the end portion 52 comes into contact with the external connector 80. With the end portion 52 being in contact with the external connector 80, the internal space of the housing 50 is sealed. The direction in which the external connector 80 is inserted into the imaging apparatus 1 is also referred to as a first direction.

The connector substrate 20 has a first surface and a second surface that is opposite to the first surface. The first surface is oriented toward the positive side in the Z-axis direction, and the second surface is oriented toward the negative side in the Z-axis direction. The connector substrate 20 includes a terminal 22. The terminal 22 is mounted on the first surface of the connector substrate 20. The terminal 22 is configured to be connectable to a terminal 82 of the external connector 80. The terminal 82 of the external connector 80 is connected to the terminal 22 of the connector substrate 20 such that the terminal 82 presses the terminal 22 toward the negative side in the Z-axis direction. With the connector substrate 20 being kept from shifting toward the negative side in the Z-axis direction by the housing 50, the terminal 82 is easily connected to the terminal 22.

If the connector substrate 20 is not kept from shifting toward the negative side in the Z-axis direction, pressing the terminal 82 of the external connector 80 against the terminal 22 of the connector substrate 20 does not ensure connection between the external connector 80 and the connector substrate 20. In this case, the connector substrate 20 needs to be connected to the external connector 80 before being accommodated in the housing 50; that is, the connector substrate 20 needs to be accommodated in the housing 50 after being connected to the external connector 80. This connection procedure may be a constraint on the assembly of the imaging apparatus 1. The present embodiment enables connection of the external connector 80 to the connector substrate 20 in a state in which the connector substrate 20 is accommodated in the housing 50. As a result, a higher degree of flexibility is achieved in assembling the imaging apparatus 1.

As illustrated in FIG. 3, the connector substrate 20 includes an end portion 24. The inner wall surface 51 of the housing 50 is disposed at a predetermined distance or more from the end portion 24 of the connector substrate 20. The connector substrate 20 is thus movable within a predetermined distance range in the X-axis direction and the Y-axis direction. That is, the connector substrate 20 is movable within the predetermined range in a direction intersecting the Z-axis. As illustrated in FIG. 1, the inner wall surface 51 of the housing 50 is larger in size than the connector substrate 20 in plan view in the Z-axis direction. In this case, the connector substrate 20 is movable within the predetermined range in a direction intersecting the Z-axis, for example, in the X-axis direction or the Y-axis direction.

As illustrated in FIG. 3, the side surface portion 32 of the first sheet metal 30 is disposed at a predetermined distance or more from the end portion 24 of the connector substrate 20. The connector substrate 20 is thus movable within a predetermined distance range in the X-axis direction and the Y-axis direction in the state in which the connector substrate 20 is surrounded by the side surface portion 32 of the first sheet metal 30 in the X-axis direction and the Y-axis direction. As illustrated in FIG. 1, the side surface portion 32 on the inner side of the first sheet metal 30 is smaller in size than the inner wall surface 51 of the housing 50 and is larger in size than the connector substrate 20 in plan view in the Z-axis direction. The connector substrate 20 is thus movable within the predetermined range in a direction intersecting the Z-axis, for example, in the X-axis direction or the Y-axis direction, in the state in which the connector substrate 20 is surrounded by the side surface portion 32.

With the connector substrate 20 being movable within the predetermined range in a direction intersecting the first direction, the terminal 22 of the connector substrate 20 and the terminal 82 of the external connector 80 are easily brought into alignment with each other to enable connection between the terminal 22 and the terminal 82. Ease of assembly of the imaging apparatus 1 is achieved accordingly.

As illustrated in FIGS. 1 and 2, the connector substrate 20 is surrounded by the first sheet metal 30 and a conductive member 84 of the external connector 80. The base 36 (see FIG. 3) of the first sheet metal 30 is disposed so as to cover at least part of the second surface of the connector substrate 20. The side surface portion 32 of the first sheet metal 30 is disposed so as to cover at least part of the end portion 24 of the connector substrate 20. The first sheet metal 30 is made of a conductive material such as metal. The first sheet metal 30 is electrically connected to the ground point of the imaging apparatus 1. The first sheet metal 30 includes the side surface portion 32. The conductive member 84 is in contact with the side surface portion 32 and is electrically connected to the ground point accordingly. Together with the conductive member 84, the first sheet metal 30 provides electromagnetic shielding for the connector substrate 20.

As illustrated in FIG. 2, the imaging apparatus 1 may also include a second sheet metal 40. The second sheet metal 40 covers the imaging substrate 10. The second sheet metal 40 is made of a conductive material such as metal. The second sheet metal 40 is electrically connected to the ground point of the imaging apparatus 1 to provide electromagnetic shielding for the imaging substrate 10.

The imaging apparatus 1 may also include an intermediate substrate 70. The intermediate substrate 70 is covered by the second sheet metal 40 as well as the first sheet metal 30. The first sheet metal 30 and the second sheet metal 40 are electrically connected to the ground point of the imaging apparatus 1 to provide electromagnetic shielding for the intermediate substrate 70.

Figure 5:
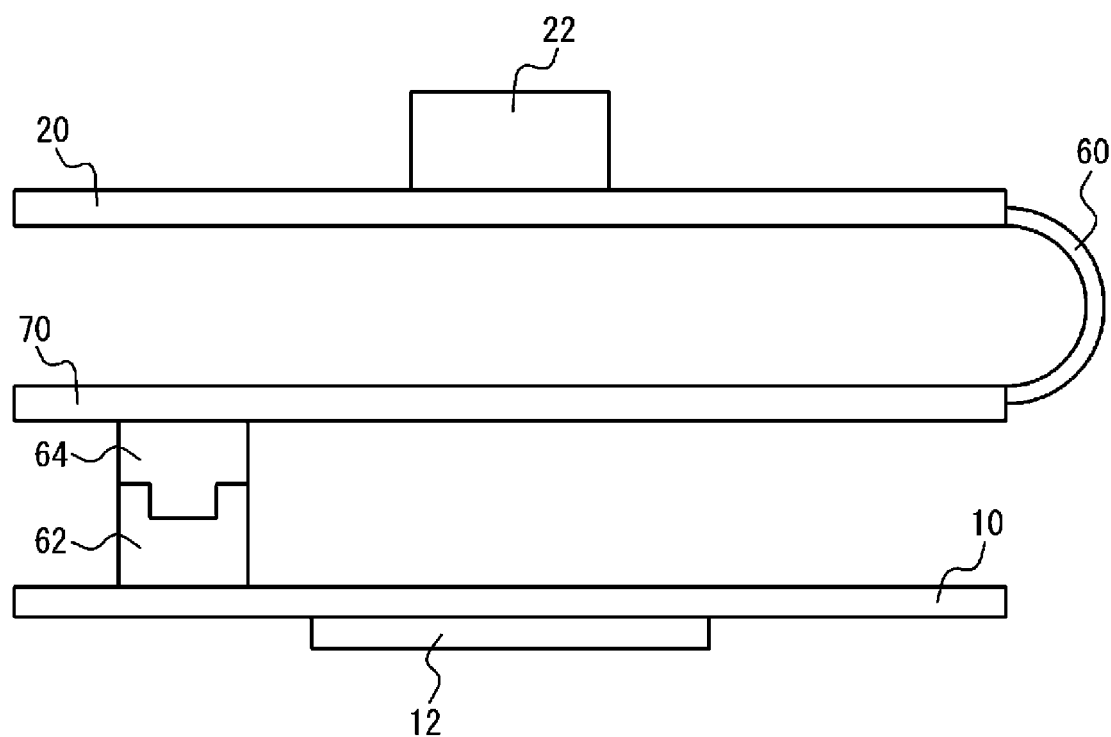
FIG. 5 is a side view, illustrating an example of the connection relationship between a connector substrate, an intermediate substrate, and an imaging substrate.
Figure 5:
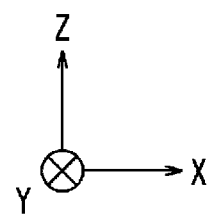

As illustrated in FIG. 5, the connector substrate 20 may be connected to the intermediate substrate 70 with a flexible substrate 60 therebetween. The connector substrate 20 may be connected to the intermediate substrate 70 via a rigid-flexible substrate. The connector substrate 20 may be connected to the intermediate substrate 70 via a cable, such as a coaxial cable or a flat cable, or via a wiring harness or the like. The connector substrate 20 may be connected to the intermediate substrate 70 via probe pins, such as pogo pins, or via contact terminals or the like. That is, the connector substrate 20 may be connected to the intermediate substrate 70 so as to be movable with respect to the intermediate substrate 70. With the connector substrate 20 being movable with respect to the intermediate substrate 70, the terminal 22 of the connector substrate 20 is easily brought into alignment with the terminal 82 of the external connector 80 to enable connection between the connector substrate 20 and the external connector 80. As a result, ease of assembly is achieved.

As illustrated in FIG. 5, the intermediate substrate 70 is provided with a board connector 64, and the imaging substrate 10 is provided with a board connector 62. The board connector 62 and the board connector 64 are joined together to form a connection between the intermediate substrate 70 and the imaging substrate 10. The imaging substrate 10 restricts movement of the intermediate substrate 70 accordingly. Although movement of the intermediate substrate 70 is restricted, the connector substrate 20 is movable with respect to the intermediate substrate 70 such that the connector substrate 20 is movable with respect to the imaging substrate 10.

In a case in which the imaging apparatus 1 does not include the intermediate substrate 70, the connector substrate 20 may be connected to the imaging substrate 10 so as to be movable with respect to the imaging substrate 10. For example, the connector substrate 20 may be connected to the imaging substrate 10 with the flexible substrate 60 therebetween. The connector substrate 20 may be connected to the imaging substrate 10 via a rigid-flexible substrate. The connector substrate 20 may be connected to the imaging substrate 10 via a cable, such as a coaxial cable or a flat cable, or via a wiring harness or the like. The connector substrate 20 may be connected to the imaging substrate 10 via probe pins, such as pogo pins, or via contact terminals or the like.

The imaging apparatus 1 according to the present disclosure may be installed in a mobile object. The mobile object referred to in the present disclosure may be a vehicle, a ship, or an aircraft. Examples of the vehicle referred to in the present disclosure include automobiles and industrial vehicles and may also include rail cars, vehicles for non-industrial use, and fixed-wing aircrafts that run along runways. The vehicles include passenger cars, trucks, buses, two-wheelers, trolley buses, and other vehicles that travel on roads. The industrial vehicles include agricultural vehicles and construction vehicles. The industrial vehicles include forklifts and golf carts but are not limited to these examples. The industrial vehicles for agricultural use include tractors, cultivators, transplanters, binders, combines, and lawn mowers but are not limited to these examples. The industrial vehicles for construction work include bulldozers, scrapers, excavators, crane trucks, dump trucks, and road rollers but are not limited to these examples. The vehicles also include man-powered vehicles. The classification of vehicles is not limited to the above. For example, automobiles may include industrial vehicles that can travel on roads; that is, the same vehicle may be put into different classifications. Examples of the ship referred to in the present disclosure include personal watercrafts, boats, and tankers. Examples of the aircraft referred to in the present disclosure include fixed-wing aircrafts and rotary wing aircrafts.

The accompanying drawings are schematic representations of an embodiment of the present disclosure. Constituent elements are not drawn to scale, and the dimension ratios thereof are not necessarily fully corresponding to the actual dimension ratios.

Although an embodiment of the present disclosure has been described above with reference to the accompanying drawings and by way of examples, various alterations or modifications may be made by those skilled in the art. It is to be understood that such alterations and modifications fall within the scope of the present disclosure. For example, functions and the like of each constituent part or each step can be rearranged in any way that involves no logical inconsistency, and constituent parts or steps can be combined into one or divided. While the present disclosure has been described above with a focus on an embodiment in the form of an apparatus, the present disclosure may be embodied in the form of a method that includes steps performed by constituent parts of an apparatus. Furthermore, the present disclosure may be embodied in the form of a method or program executed by a processor included in an apparatus or may be embodied in the form of a recording medium on which a program is recorded. It is to be understood that such embodiments also fall within the scope of the present disclosure.

The words "first", "second", and so on in the present disclosure are identifiers for distinguishing between constituent elements. With the constituent elements being distinguishable by "first", "second", and so on in the present disclosure, the identifiers assigned to these constituent elements are interchangeable. For example, the identifiers "first" and "second" that are assigned to the respective lenses are interchangeable. The identifiers are to be interchanged all at once. The elements remain distinguishable from each other after interchanges of identifiers. The identifiers may be omitted. Constituent elements from which the identifiers are omitted are distinguished by reference signs. In the present disclosure, the identifiers "first", "second" and so on should not be used for interpretation of the order of the constituent elements or should not be used as grounds for the presence of lower numbered identifiers.

In the present disclosure, the X-axis, the Y-axis, and the Z-axis are provided for convenience of illustration and are interchangeable. Constituent elements referred to in the present disclosure have been described using the Cartesian coordinate system based on coordinate axes: the X-axis, the Y-axis, and the Z-axis. It is not required that the constituent elements referred to the present disclosure be orthogonal to each other.

The invention claimed is:

1. An imaging apparatus, comprising:
   an imaging substrate provided with an imaging device that produces image data;
   a connector substrate movably connected to the imaging substrate within a predetermined range in a direction intersecting a first direction, the connector substrate including a terminal configured to be connectable in the first direction to an external connector to which the image data is output; and
   a housing in which the imaging substrate and the connector substrate are accommodated, the housing including a restricting section that restricts a position of the connector substrate in the first direction.

2. The imaging apparatus according to claim 1, wherein
   the housing has an inner wall surface that defines an internal space in which the imaging substrate and the connector substrate are placed, and
   the inner wall surface is larger in size than the connector substrate in a plan view in the first direction.

3. The imaging apparatus according to claim 2, wherein
   the housing includes an end portion defining an opening from the internal space toward an outside of the housing, and
   the end portion is configured to, when the external connector is connected to the connector substrate, be in contact with the external connector and seal the opening.

4. The imaging apparatus according to claim 2, further comprising a sheet-metal member, wherein
   the connector substrate has
      a first surface on which the terminal configured to be connectable to the external connector is mounted, and
      a second surface that is opposite to the first surface,
   the sheet-metal member is disposed so as to cover at least part of the second surface of the connector substrate, and
   the restricting section restricts a position of the sheet-metal member in the first direction.

5. The imaging apparatus according to claim 4, wherein
   the housing includes an end portion defining an opening from the internal space toward an outside of the housing, and
   the end portion is configured to, when the external connector is connected to the connector substrate, be in contact with the external connector and seal the opening.

6. The imaging apparatus according to claim 4, wherein
   the sheet-metal member includes a side surface portion that is disposed so as to cover at least part of an end portion of the connector substrate, and
   the side surface portion is elastic and is configured to be displaceable relative to the inner wall surface of the housing.

7. The imaging apparatus according to claim 6, wherein
   the housing includes an end portion defining an opening from the internal space toward an outside of the housing, and
   the end portion is configured to, when the external connector is connected to the connector substrate, be in contact with the external connector and seal the opening.

8. The imaging apparatus according to claim 6, wherein
   the side surface portion on an inner side of the sheet-metal member is smaller in size than the inner wall surface of the housing, and is larger in size than the connector substrate in the plan view in the first direction.

9. The imaging apparatus according to claim 8, wherein
   the housing includes an end portion defining an opening from the internal space toward an outside of the housing, and
   the end portion is configured to, when the external connector is connected to the connector substrate, be in contact with the external connector and seal the opening.

10. A mobile object comprising:
   an imaging apparatus is installed, the imaging apparatus comprising
      an imaging substrate provided with an imaging device that produces image data,
      a connector substrate movably connected to the imaging substrate within a predetermined range in a direction intersecting a first direction, the connector substrate including a terminal configured to be connectable in the first direction to an external connector to which the image data is output; and
      a housing in which the imaging substrate and the connector substrate are accommodated, the housing including a restricting section that restricts a position of the connector substrate in the first direction.

* * * * *